United States Patent [19]

Colasanti et al.

[11] 4,337,906

[45] Jul. 6, 1982

[54] LOCK UP MECHANISM FOR SEAT BELT RETRACTOR

[75] Inventors: Arduino Colasanti, East Detroit; Philip L. Francis, Bloomfield Hills, both of Mich.

[73] Assignee: Allied Corporation, Morris Township, Morris County, N.J.

[21] Appl. No.: 208,007

[22] Filed: Nov. 18, 1980

[51] Int. Cl.³ .................. A62B 35/02; B65H 75/48
[52] U.S. Cl. .................................... 242/107.4 A
[58] Field of Search .............. 242/107.4 R–107.4 E; 297/478, 480; 280/806

[56] References Cited

U.S. PATENT DOCUMENTS

| | | | |
|---|---|---|---|
| 3,868,068 | 2/1975 | Heath | 242/107.4 A |
| 3,901,459 | 8/1975 | Romanzi et al. | 242/107.4 A |
| 3,942,739 | 3/1976 | Torphammar et al. | 242/107.4 A |
| 4,085,905 | 4/1978 | Lindblad | 242/10 7.4 A |
| 4,190,213 | 2/1980 | Ueda | 242/107.4 A |

Primary Examiner—John M. Jillions
Attorney, Agent, or Firm—Roger H. Criss

[57] ABSTRACT

A seat belt retractor lock up mechanism comprises a main ratchet gear (20) mounted on one end of a spool carrying seat belt webbing (100) in helical wrap. The main ratchet gear (20) is engageable by a lock dog tab (80) located on supporting slots (120, 125) formed in opposite upstanding walls (10, 11) of the retractor housing. A vehicle inertial response pendulum (40) is coupled to the lock dog tab (80) through a pilot pawl (50) and gear (15) assembly mounted on the end of the spool opposite the main gear (20). Upon collision, the pendulum (40) pivots the pilot pawl (50) into the pilot gear (15). During pay out of the belt webbing (100), the pilot gear (15) thrusts the pilot pawl (50) into the lock dog tab (80), pivoting the tab (80) into the main ratchet gear (20) for lock up. The main ratchet gear (20) and lock dog tab (80) receive most of the load during collision, enabling the pilot pawl (30) and pendulum (40) to be small and light weight.

7 Claims, 5 Drawing Figures

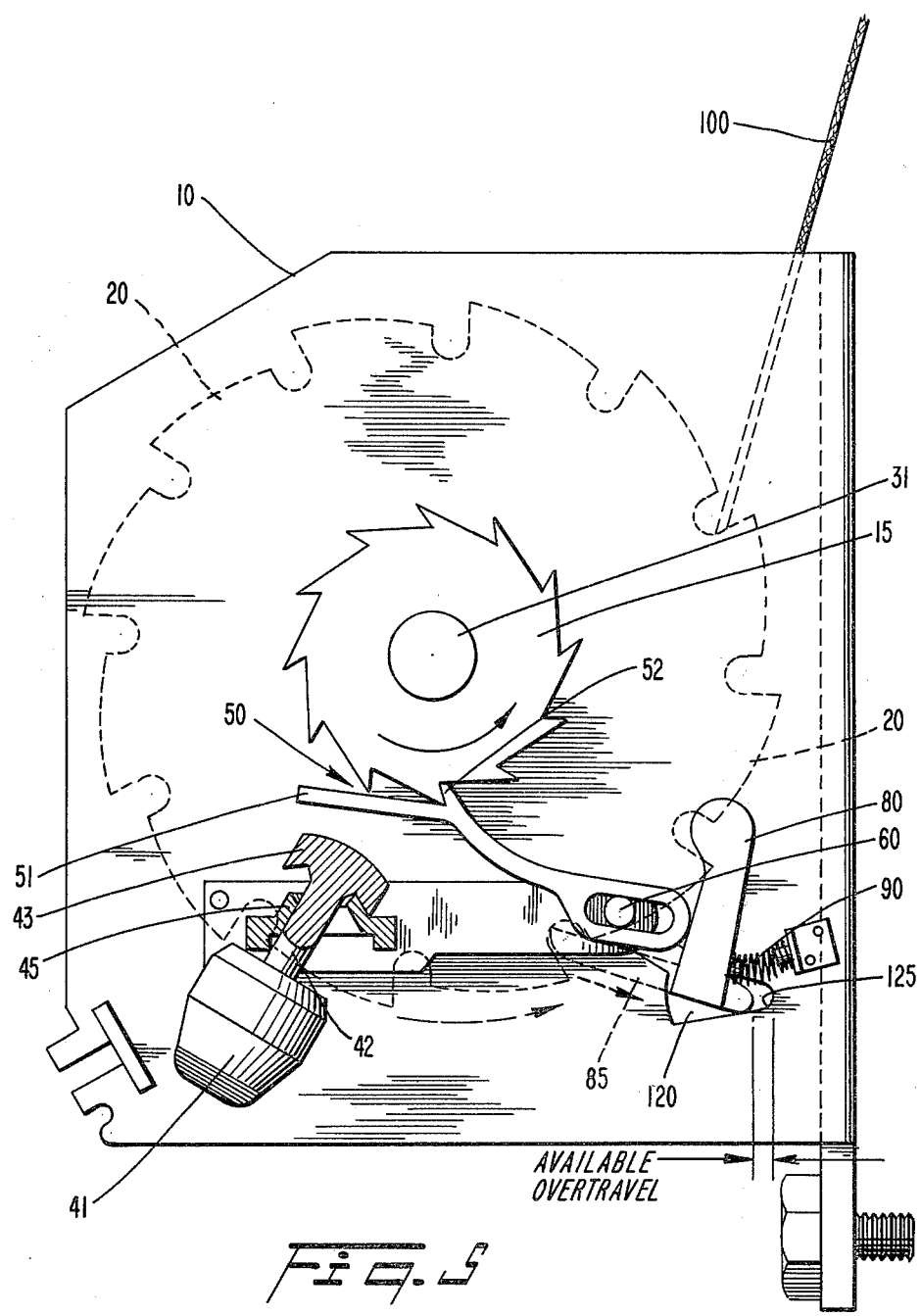

LOCK UP MECHANISM FOR SEAT BELT RETRACTOR

TECHNICAL FIELD

This invention relates generally to vehicle safety seat belt retractors, and more particularly to a seat belt lock up mechanism using a novel pilot pawl and gear assembly to reduce pendulum size and weight.

BACKGROUND ART

Safety belt retractor mechanisms which store seat belt webbing in helical wrap are well known. The retractor is often positioned adjacent the occupant seat where seat belt webbing may be drawn from the retractor by the occupant and coupled to other seat belt webbing to form lap and shoulder safety seat belts. To restrain occupants from sudden forward movement during collision, many prior art retractors include an inertia responsive locking device to prevent extraction of the belt. One such retractor mechanism utilizing a lock up device is shown in U.S. Pat. No. 3,858,824 to Stephenson. This lock up device comprises a pendulum supporting an extending arm pivoted at one end to the housing. The opposite end of the arm supports the pawl of a pawl and ratchet gear mechanism in an unlocked position. The pawl is engageable with the teeth of the ratchet gear on a web storage spool to prevent seat belt pay out upon collision. During a collision, the pendulum swings toward the point of impact. This pendular movement lifts the extending arm that in turn pivots the pawl into locking engagement with the ratchet wheel to prevent further pay out of the seat belt.

In view of the substantial loading imparted on the pawl in lock with the ratchet gear during collision, it will be appreciated that the pawl must be rugged. Moreover, since the pawl rotates directly in response to lifting of the arm by the pendulum, the pendulum must have sufficient moment to lift the arm as well as the pawl to lock the pawl and gear assembly. This requires a pendulum of relatively large size and weight to attain the momentum necessary to lock up the retractor mechanism. That requirement increases the overall size and weight of retractors employing such a lock up mechanism. A similar lock up mechanism is shown in U.S. Pat. No. 3,918,658 to Beller.

In accordance with vehicle weight reduction objectives to meet current fuel economy standards, and further in view of vehicle packaging requirements which demand smaller retractors, there exists a need to reduce the size of the above described retractor, without sacrificing reliability, in dual sensitive as well as single sensitive retractor systems.

One object of the present invention, therefore, is to provide a retractor locking mechanism which reduces the overall size and weight of the retractor.

Another object of the invention is to provide a retractor locking mechanism which is rugged in design and capable of reliable operation.

Yet another object is to provide a retractor locking mechanism which can also be used in dual sensitive retractors.

DISCLOSURE OF INVENTION

A safety belt webbing retractor, in accordance with the invention, is reduced in size by an improved locking mechanism that includes a light weight pilot pawl and ratchet gear assembly. The pilot assembly operates a heavier locking dog and main ratchet gear to lock up a webbing storage spool upon collision.

The retractor includes a housing having two upstanding side walls to which is journalled a rotatable shaft fixed to the storage spool. The main ratchet gear is secured to one end of the spool shaft at the inner surface of one of the housing walls. The pilot gear is secured to the opposite end of the spool shaft at the outer surface of the opposite housing wall. Adjacent the pilot gear, the pendulum is suspended from a support collar extending from the wall.

A light weight pilot pawl is positioned on the same wall with one end of the pawl seated on the upper end of the pendulum and the opposite end abutting a lock dog. A supporting pin formed in the same wall engages the pilot pawl to enable transverse sliding as well as pivoting of the pilot pawl. The lock dog extends between the two housing walls adjacent the storage spool, supported on corresponding wall slots. One end of the lock dog is formed with a main pawl adapted to lock with the main ratchet gear; the opposite end extending through the housing wall is formed with a tab positioned in contact with the pilot pawl.

During normal vehicle acceleration, the pendulum extends vertically downwardly from the support collar, the pilot pawl and pilot ratchet gear are disengaged and the lock dog pawl and main ratchet gear are also disengaged. Upon collision, however, the pendulum pivots about the support collar to urge the pilot pawl into engagement with the pilot gear. During pay out of the seat belt webbing, the pilot gear thrusts the pilot pawl into the lock dog tab.

The lock dog tab is pivoted by the pilot pawl to cause the main pawl portion of the dog to engage the main ratchet, locking the storage spool to prevent further pay out of belt webbing. The length of the supporting slot in the housing wall at the pilot gear side of the housing is slightly larger than the length of the corresponding slot in the opposite wall to minimize loading on the pilot components during lock up. This structure enables the pilot components to be small and light weight. The lighter pilot components operate with a lighter pendulum than would otherwise be possible.

Still other objects and advantages of the present invention will become readily apparent to those skilled in this art from the following detailed description, wherein we have shown and described only the preferred embodiment of the invention, simply by way of illustration of the best mode contemplated by us of carrying out our invention. As will be realized, the invention is capable of other and different embodiments, and its several details are capable of modifications in various obvious respects, all without departing from the invention. Accordingly, the drawings and description are to be regarded as illustrative in nature, and not as restrictive.

BRIEF DESCRIPTION OF DRAWINGS

FIG. 5 depicts the final event of the lock up series as the pilot pawl slides into the lock dog tab causing the main lock dog to engage the main ratchet gear.

BEST MODE FOR CARRYING OUT THE INVENTION

Figure 1:
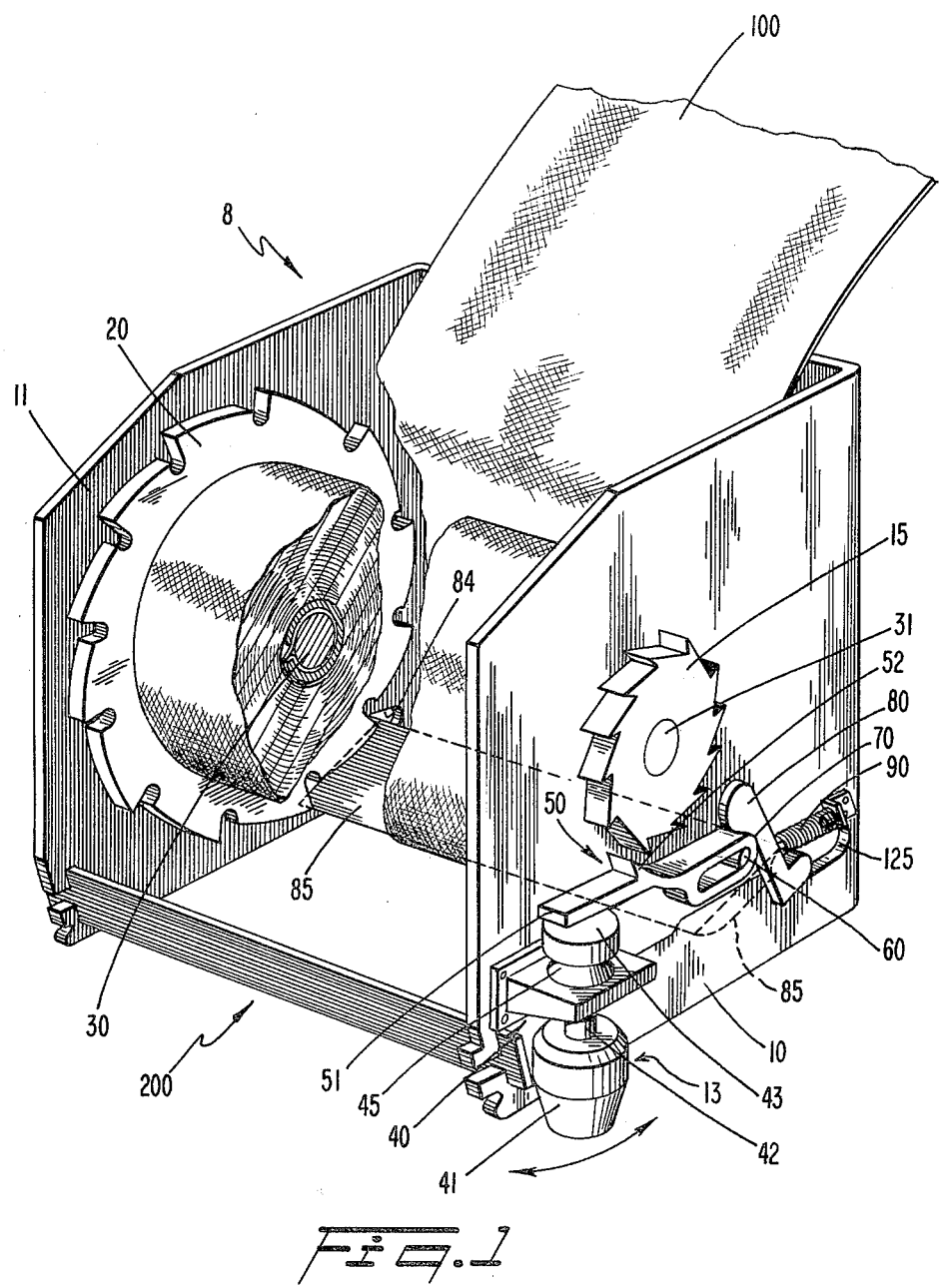
FIG. 1 is a perspective view of a seat belt retractor, with a portion of the webbing storage spool cut away to expose locking elements of the invention.

Reference will now be made in detail to the present preferred embodiment of the invention, an example of which is illustrated in the accompanying drawing. Referring first to FIG. 1, the retractor 8 is illustrated with a locking mechanism in an unlocked position, and comprises a housing 200 having a pair of side support walls 10, 11. Rotatable shaft 30, journalled in walls 10, 11 for rotation in either direction, passes through support wall 10 to form shaft extension 31. The extension 31 projects beyond the outer surface of the wall 10 and is fixed to pilot ratchet gear 15. A spool 90 is fixed for common rotation with shaft 30 between the walls 10, 11 for storing seat belt webbing 100 in helical wrap. The spool is biased by a spring (not shown) to be fully wound. Main ratchet gear 20 is fixed on shaft 30 adjacent the inner surface of opposite support wall 11.

An inertial sensing means 13 movable in response to vehicle acceleration is mounted on wall 10 by support collar 45. The term "acceleration" is to be interpreted herein as any change in speed or direction of the vehicle. Preferably, the inertial sensing means 13 includes a pendulum 40 having a weight 41 suspended from a rigid stem 42 and topped with an upwardly convex shaped disc 43. The pendulum 40 (see FIG. 2) is mounted to support collar 45 with stem 42 passing through an opening in the collar and the disc 43 seated upon the upper surface of the collar. Collar 45 has a diameter sufficient to permit pendulum 40 to swing without restraint, and may be secured to the support wall 10 by any suitable means.

A pilot pawl 50 (FIG. 2) is formed with a slotted opening 55 at one end, an arm 51 at the opposite end and an intermediate lock projection 52. Slotted opening 55 receives pin 60, attached and projecting outwardly from wall 10, for supporting the pawl 50 adjacent, substantially parallel to and in pivotal and sliding relation with the wall outer surface. A boss (not shown) on the pin 60 prevents pawl 50 from disengaging the pin. Arm 51 of pilot pawl 50, seated on disc 43, lifts and pivots pilot pawl 50 about pin 60 in response to rocking of disc 43 during acceleration of the vehicle sufficient to displace pendulum weight 41 from its vertical equilibrium position.

A main lock dog pawl 85, positioned parallel to the inner surface of wall 11 within the plane of main ratchet gear 20 inside the retractor, extends between the walls 10, 11. End 84 of lock dog 85 is seated within slot 125 formed in side wall 11. The opposite end of lock dog 85 terminates in an upwardly extending main lock dog tab 80. The main lock dog tab 80 thus projects out of slotted opening 120, formed in wall 10, and is maintained in abutment with the trailing end 70 of pilot pawl 50 by biasing spring 90 (see FIG. 2). Spring 90 may include a coiled spring housed in a hollow pin shaft secured to the outside surface of sidewall 10 adjacent the lock dog tab. Because lock dog tab 80 and end 84 ride on the lips of their respective slotted openings 120, 125, it may be desirable to secure a plastic insert about the lips, or to coat the lips with plastic, to prevent metal to metal contact.

Figure 2:
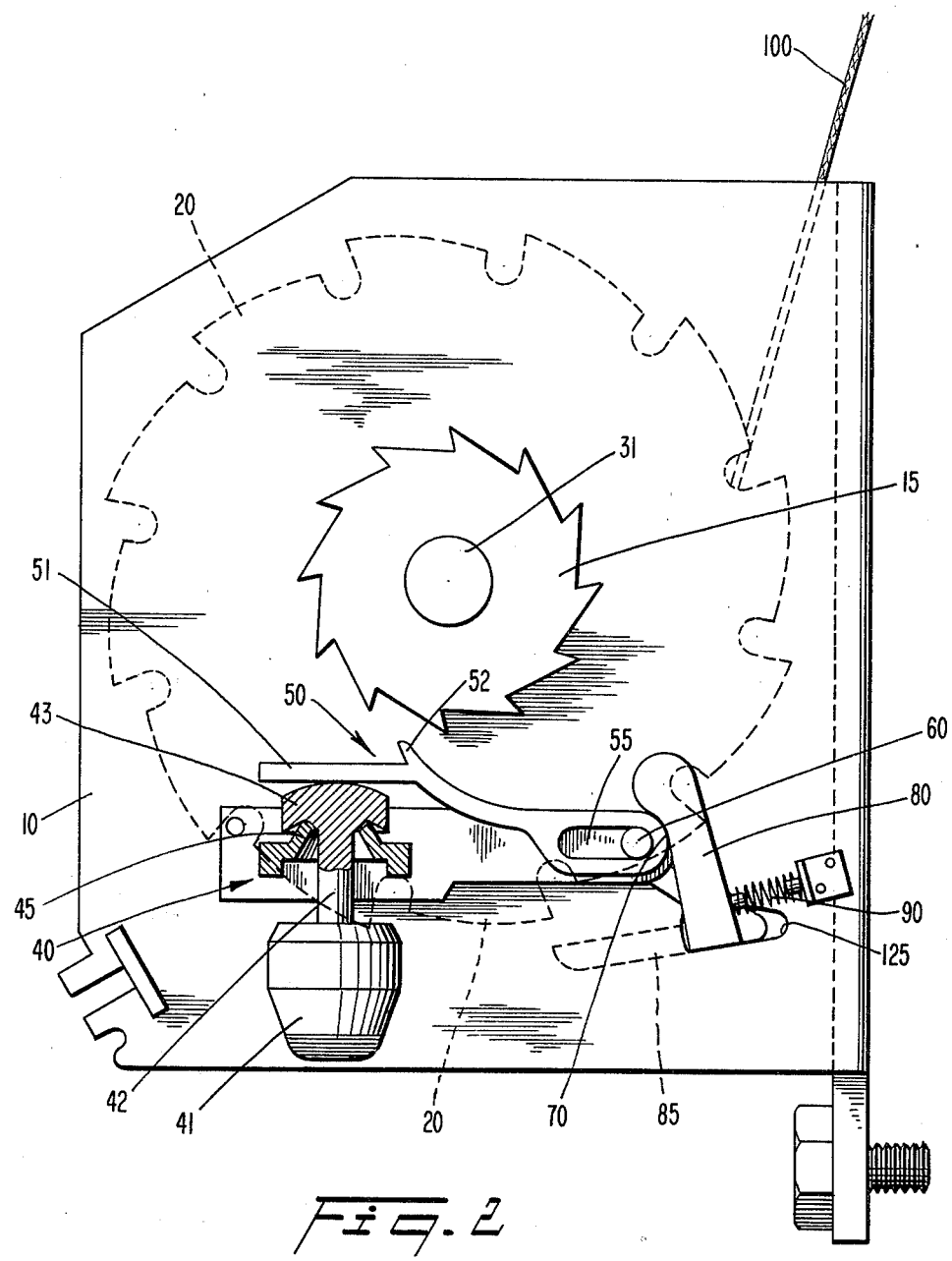
FIG. 2 is an end view of a portion of the retractor of FIG. 1 showing the operative arrangement of the lock up components, in accordance with the invention, in an unlocked position.

The full advantage of this invention may best be realized by following the movement of the lock up mechanism from unlocked to locked position as shown in FIGS. 2–5. Referring first to FIG. 2, when retractor 200 is unlocked, pendulum 40 is in a vertical equilibrium position. Arm 51 of pawl 50 is supported by pendulum disc 43 out of contact with pilot gear 15. The trailing end 70 of the pilot pawl abuts main lock dog tab 80, which is biased into contact with the pawl by spring 90. Main lock dog pawl 85, which is in a downwardly pivoted position in FIGS. 1 and 2, is seated in slotted opening 125 of the wall 10.

Figure 3:
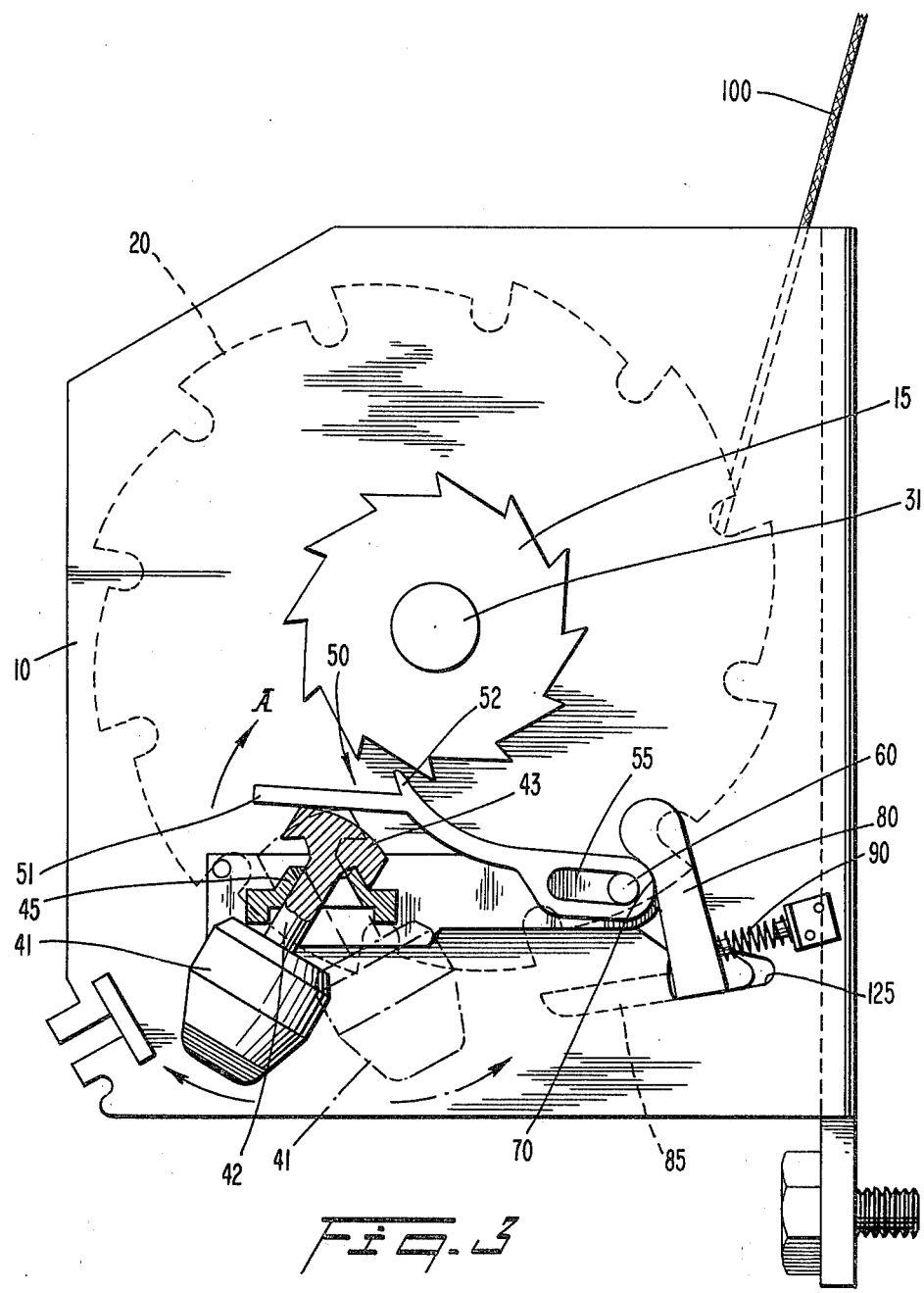
FIG. 3 depicts a first of a series of events that occurs on the retractor of FIG. 1 upon a collision or abrupt change in vehicular velocity.

Upon sudden acceleration, however, pendulum weight 41 swings, causing arm 51 of pilot pawl 50 to lift and pivot about pin 60 until lock projection 52 of the pawl engages a tooth of pilot gear 15 (see FIG. 3). At this time in the lock up sequence, operation of pendulum 40, viz, that of pivoting the pilot pawl 50 into locking engagement with pilot gear 15, has been completed. The lock up mechanism disclosed herein requires a pendulum of relatively small size and mass to lift pilot pawl 50, which is fabricated from a light weight material such as plastic. The size of the pendulum weight 41 is further reduced by locating the pendulum at the end of pilot pawl opposite pivot pin 60 because the greater lever arm distance between pin 60 and arm 51 requires a smaller lifting force to lift the pilot pawl 50.

Figure 4:
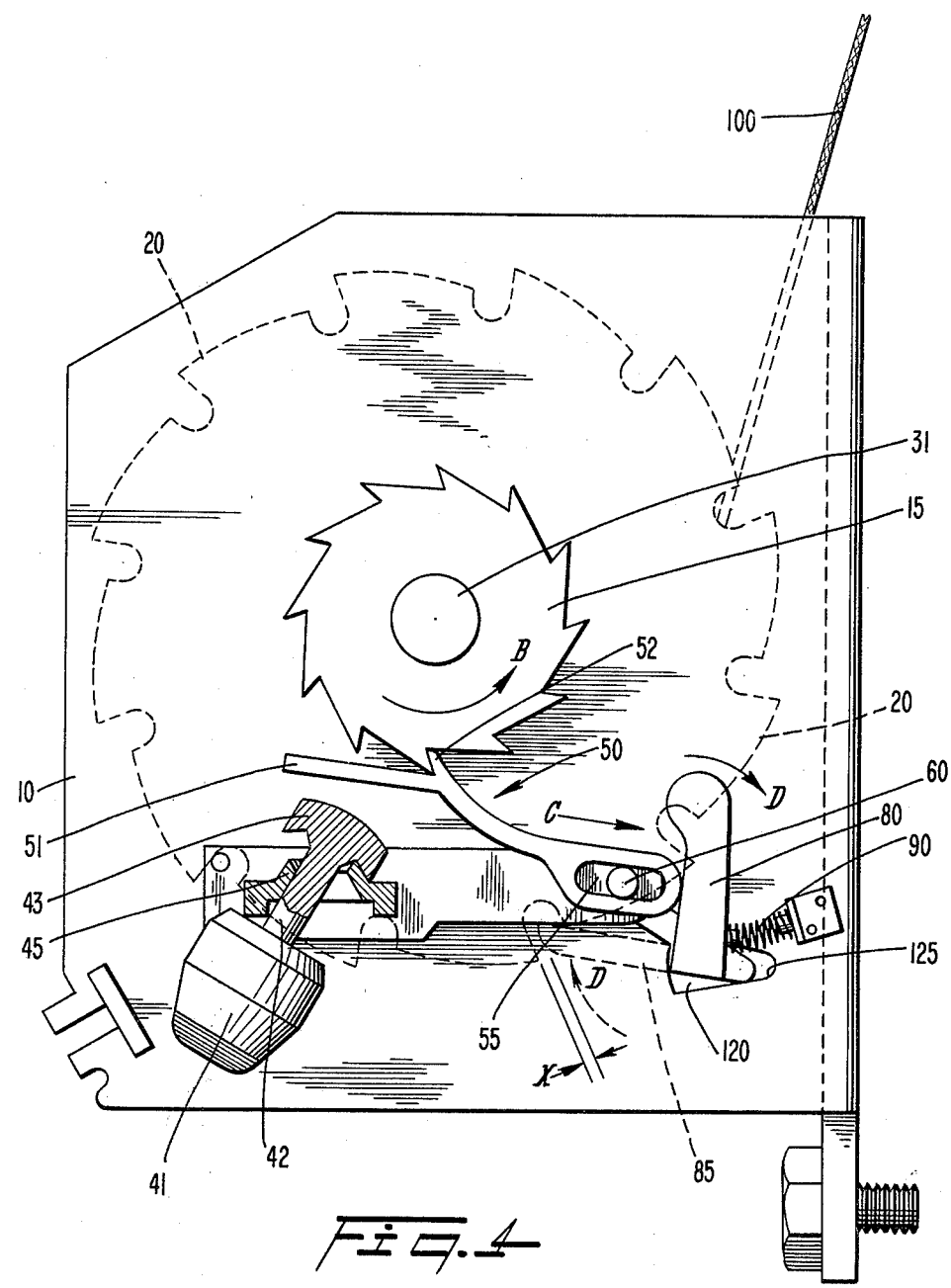
FIG. 4 depicts a second of the series of events as the pilot pawl engages a tooth of the pilot gear.

Referring now to FIG. 4, after pilot pawl 50 engages the rotating pilot gear 15, further rotation of gear 15 during pay out of belt webbing 100 forces the pawl to slide in direction C about pin 60. The application of this force to the lock dog tab 80 overcomes the biasing force of spring 90. As the dog tab 80 pivots within slot 120 in direction D, main lock dog pawl 85 pivots upwardly about end 84 (FIG. 1) within slot 125 to engage a tooth of main ratchet gear 20. Spring 90 biases lock dog 85 to ensure locking engagement.

The teeth of the main gear 20 are timed to the teeth of the pilot gear 50 so that the main lock dog pawl 85 enters the main gear just before the engageable tooth on the main gear reaches the main pawl. As shown in FIG. 4, tolerances are such that a relatively small (e.g., 1.5 mm) clearance between the main lock dog and its gear tooth will be present under this phase of the lock up sequence (dimension X).

FIG. 5 illustrates final lock up of the retractor 200. As webbing 100 is further extracted, pilot pawl 50 and main gear 20 force end 84 (FIG. 1) of main lock dog pawl 85 toward the bottom of slot 125. When a tooth of the main gear 20 has completely engaged with the main lock dog 85 and the main lock dog has bottomed out in slot 125, retractor 200 is fully locked and is incapable of allowing further webbing extraction resulting from collision induced occupant loads. Under this condition, it will be appreciated that if slotted openings 120, 125 were of the same length and if dimension X (FIG. 3) were maximum, the load on pilot pawl 50 could be severe. To reduce loading of pilot pawl 50, the length of slot 120 is slightly larger than the length of the opposite slot 125. Thus, during lock up, whereas the lock dog end 84 supported by wall 11 is jammed into the rear of supporting slot 125, there is some clearance between dog tab 80 and slot 120 to permit lock dog tab 80 to pivot into the bottom of the slot 120. This clearance substantially relieves loading of the pilot pawl 50 during collision.

Thereafter, when loading of the retractor is removed, both the pilot pawl 50 and main lock dog 85 disengage from the teeth of the respective gears. Spring 90 now urges lock dog tab 80 to its original position and slides pilot pawl 50 back to its original position.

In this disclosure, there is shown and described only the preferred embodiment of the invention, but, as aforementioned, it is to be understood that the invention is capable of use in various other combinations and environments and is capable of changes or modifications within the scope of the inventive concept as expressed herein. For example, while the lock up mechanism disclosed herein is discussed in connection with a pendulum type inertial sensing means, other vehicle sensing means could also be improved by the present invention. Furthermore, the lock up mechanism of the present invention can be used in a web sensitive mechanism to provide a dual sensitive retractor.

We claim:

1. A seat belt retractor for installation in a vehicle comprising:
   a frame having upstanding side walls;
   a spool rotatably supported in said frame;
   seat belt webbing stored on said spool;
   main ratchet wheel means having circumferential ratchet teeth and being rotatable with said spool, said main ratchet wheel means being positioned adjacent to one of said upstanding side walls;
   main locking means for locking said main ratchet means;
   a slotted opening in each of said upstanding side walls, said main locking means being pivotably supported in said slotted openings;
   a pilot ratchet wheel having circumferential ratchet teeth, said pilot ratchet wheel being rotatable in unison with said main ratchet wheel means and being positioned adjacent to the other of said upstanding side walls;
   inertia sensor means movable in response to acceleration or deceleration of said vehicle; and
   a pilot pawl supported in said frame for pivotal and transverse movements and being positioned between said inertia sensor means and said pilot ratchet wheel, said pilot pawl being movable into engagement with said pilot ratchet wheel in response to actuation of said inertia sensor means, whereby said main locking means is moved by said pilot pawl into locking engagement with said main ratchet wheel means, thereby locking said retractor;
   said slotted opening in said other of said upstanding side walls adjacent said pilot ratchet wheel being provided with an elongated portion adjacent an end thereof which supports said main locking means so that the said slotted opening is longer than said slotted opening in said one of said upstanding side walls adjacent said main ratchet wheel means, said main locking means being movable into said elongated portion as result of excessive locking forces being exerted on said main locking means, whereby loads on said pilot pawl and said pilot ratchet wheel are reduced.

2. The retractor of claim 1 wherein said pilot pawl is in the form of an integral, elongated structure, one end of said pilot pawl being in contact with said inertia sensor means and the opposite end being in contact with said main locking means, said pilot pawl comprising an intermediate projection engageable with said ratchet teeth of said pilot ratchet wheel.

3. The retractor of claim 2 wherein said pilot pawl adjacent its opposite end is provided with a slotted opening and including a pin extending from said frame into said slotted opening, said pilot pawl being pivotable about said pin and movable transverse with respect to said pin.

4. The retractor of claim 3 wherein said one end of said pilot pawl is movable upwardly in response to actuation of said inertia sensor means, said pilot pawl pivoting on said pin, whereby said intermediate projection comes into engagement with said pilot ratchet wheel, and said pilot pawl is movable transverse with respect to said pin following rotation of said pilot ratchet wheel subsequent to engagement with said pilot pawl, whereby said other end of said pilot pawl forces said main locking means into engagement with said main ratchet wheel means.

5. The retractor of claim 4 wherein said inertia sensor means, said pilot pawl and said pilot ratchet wheel are provided on the outside of said other of said upstanding side walls, said main locking means comprising a rigid lock dog having an upwardly extending tab portion projecting through said slotted opening in said other of said upstanding side walls, said other end of said pilot pawl being in contact with said tab portion.

6. The retractor of claim 5 wherein said inertia sensor means comprises a pendulum comprising a mass extending from a stem connected to a cap member, said cap member being supported in a collar mounted on said other of said upstanding side walls, the upper portion of said cap member being in contact with said pilot pawl.

7. The retractor of claim 6 wherein said main ratchet wheel means comprises a ratchet gear positioned adjacent the inside surface of said one of said upstanding side walls.

* * * * *